April 10, 1928.
D. F. YOUNGBLOOD
1,665,651
PNEUMATIC CAGE FOR PRISONS, VAULTS, AND THE LIKE
Filed Nov. 14, 1925
3 Sheets-Sheet 1
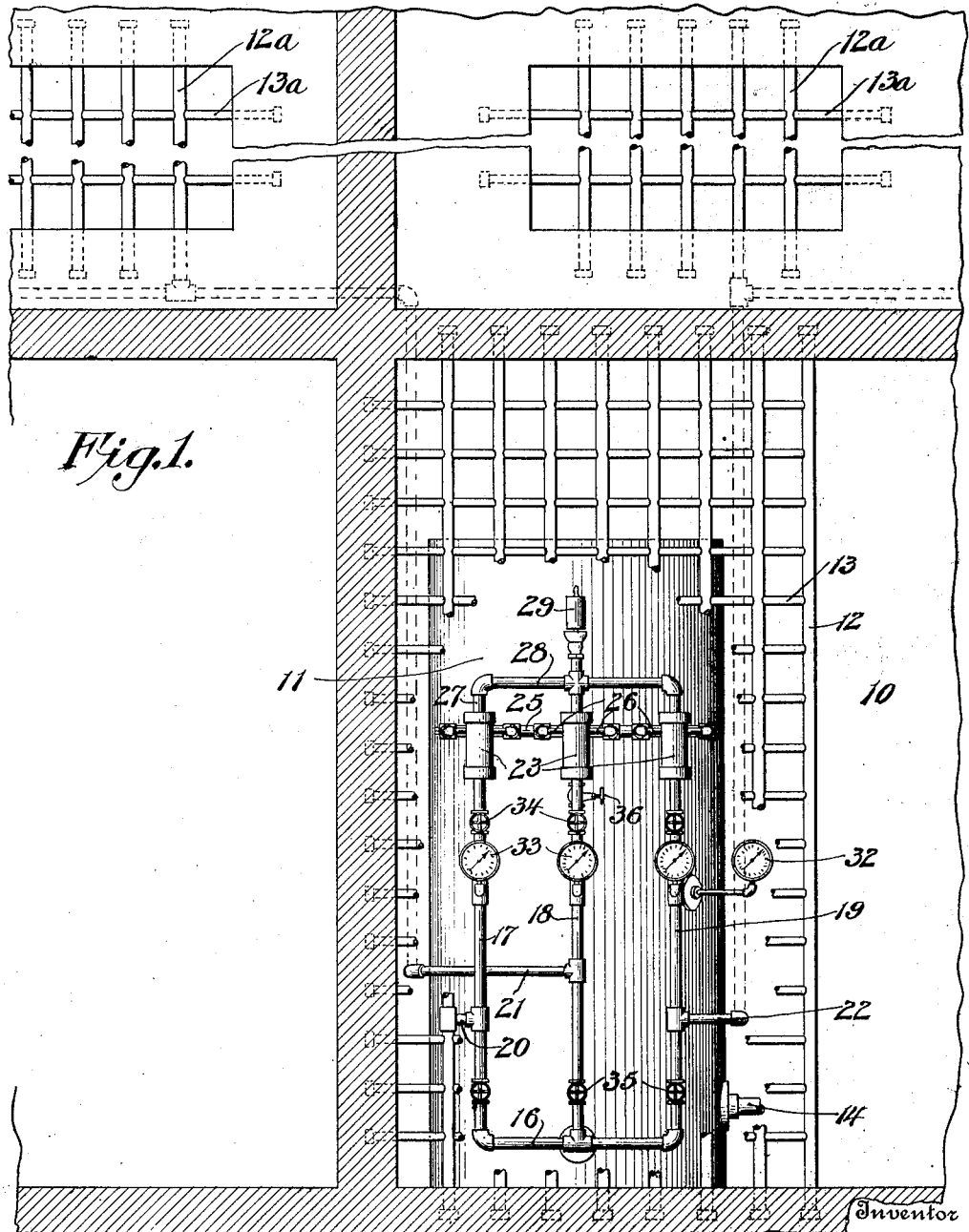
Fig.1.
Witnesses
C. L. McDonald
E. N. Lovewell
Inventor
David F. Youngblood
By
Attorney April 10, 1928.

D. F. YOUNGBLOOD 1,665,651

PNEUMATIC CAGE FOR PRISONS, VAULTS, AND THE LIKE

Filed Nov. 14, 1925    3 Sheets-Sheet 2

Witnesses
C. L. McDonald
E. N. Lovewell

Inventor
David F. Youngblood
By
Attorney

April 10, 1928. 1,665,651
D. F. YOUNGBLOOD
PNEUMATIC CAGE FOR PRISONS, VAULTS, AND THE LIKE
Filed Nov. 14, 1925 3 Sheets-Sheet 3
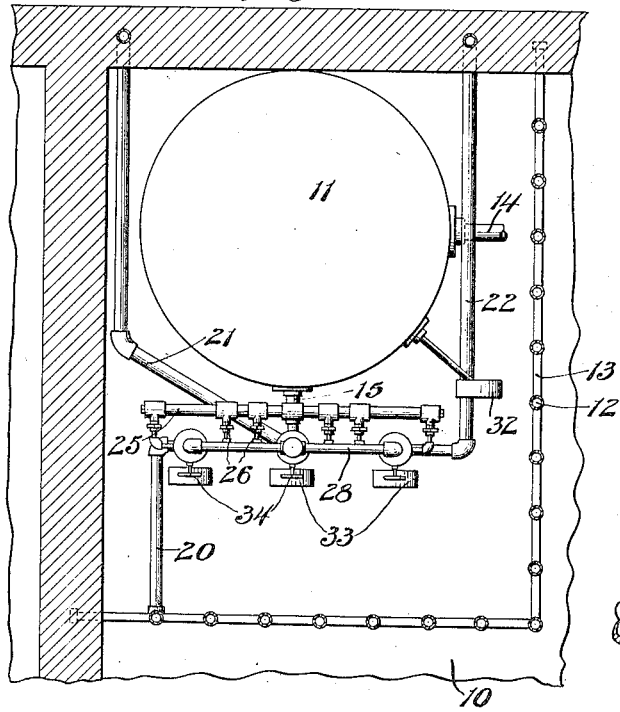
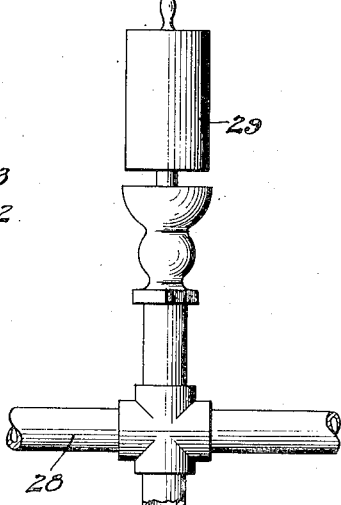
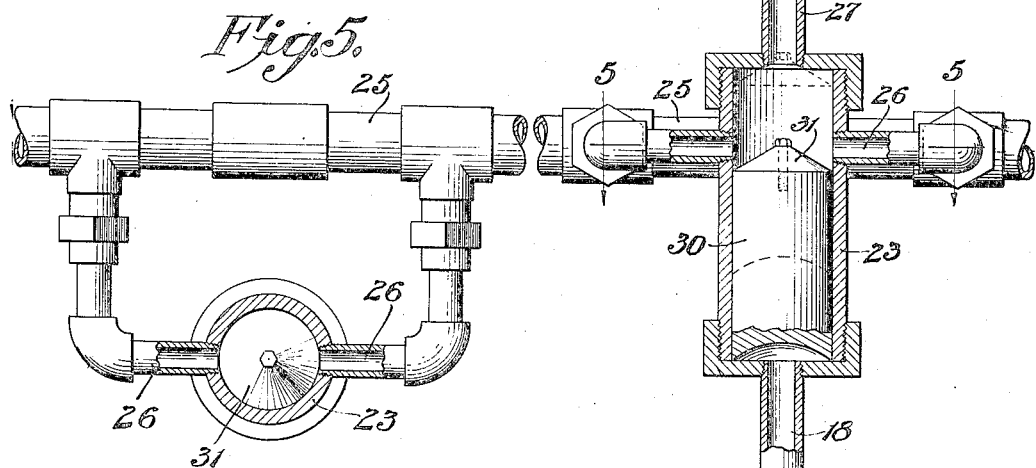
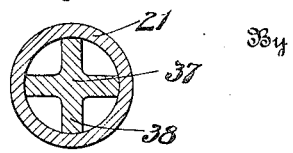
Inventor
David F. Youngblood Patented Apr. 10, 1928.

1,665,651

UNITED STATES PATENT OFFICE.

DAVID FRANKLIN YOUNGBLOOD, OF SAN ANTONIO, TEXAS.

PNEUMATIC CAGE FOR PRISONS, VAULTS, AND THE LIKE.

Application filed November 14, 1925. Serial No. 69,101.

This invention relates to pneumatic cages to be used in the construction of prisons, vaults and the like with the object of defeating any attempt to break out of the one or into the other.

Many attempts have been made, at considerable expense, to produce a steel which is tool proof, and it has been a continuous struggle between the builders of this class of work and those interested in breaking it down, with the result that no metal has yet been produced which cannot be cut by means of an acetylene torch, or an electric cutting tool designed for that purpose.

With these conditions in mind, therefore, the object of the present invention, more specifically stated, is to provide a series of pneumatic cages or gratings, so arranged and connected that the moment one of them is cut a whistle or other alarm will be sounded, and the guard will be apprised by a suitable indicator of the point where the break has been made.

The indicator, itself, is located in the guard room or office, and is also protected by a similar cage to prevent tampering therewith. The main connecting pipes leading to the cages contain corrugated bars extending throughout their length, so that it is impossible to collapse the pipe by pinching it in order to cut off communication between the cages and the indicator or the alarm, so that as long as the system is kept filled with compressed air, a break in any part thereof will immediately sound the alarm, and will be noted on the corresponding indicator.

One embodiment of the invention and its advantages will be more clearly understood from the following detailed description taken in connection with the accompanying drawings, which illustrate the same as installed in a prison structure.

In the drawings:

Figure 1 is a vertical section through a portion of the guard room or office of the prison and the rooms adjacent thereto.

Figure 3 is a horizontal section through the cage located in the guard room or office.

Figure 4 is a vertical sectional view showing the means for operating the alarm.

Figure 5 is a horizontal section taken substantially on the line 5—5 of Figure 4.

Figure 6 is a cross section of one of the main connecting pipes.

Figure 2:
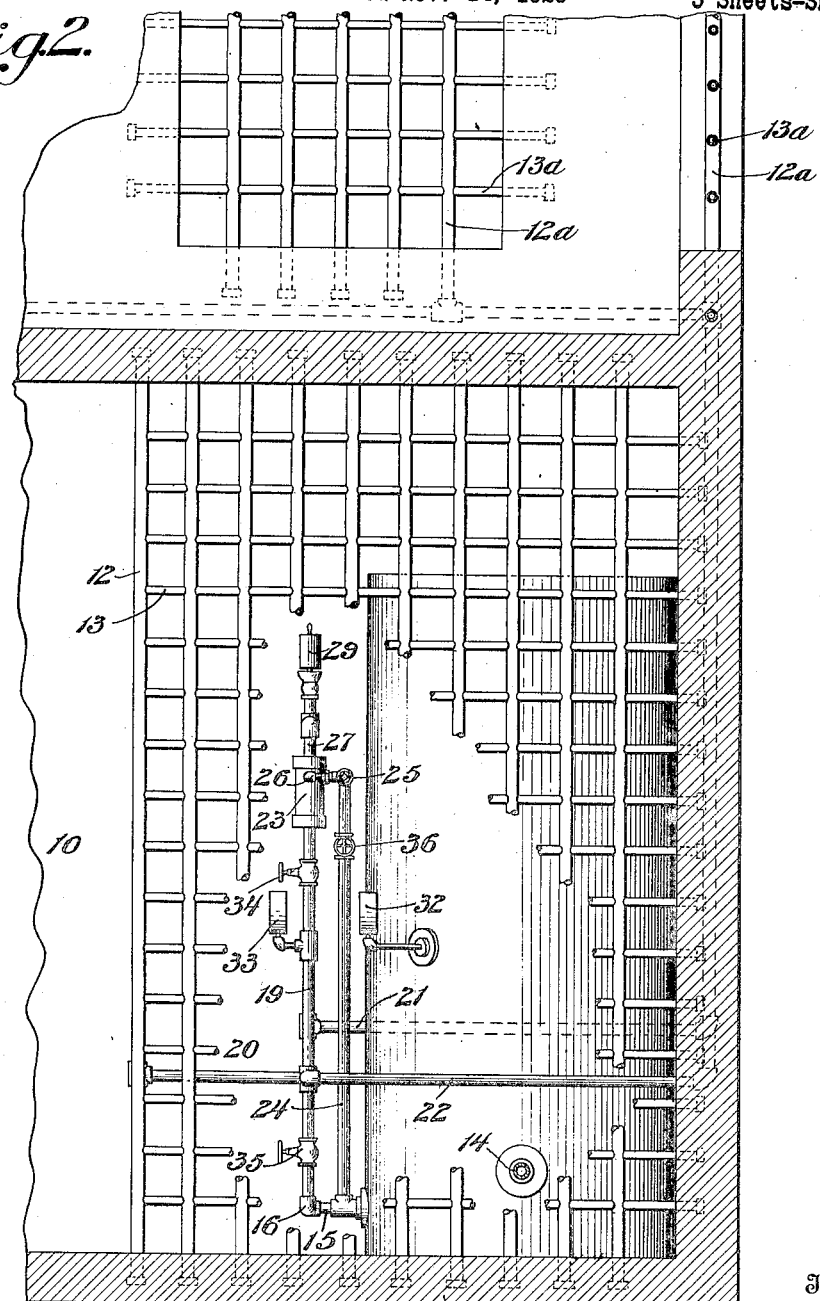
Figure 2 is a vertical section taken at right angles to the plane of Figure 1.

The preferred embodiment of the invention is shown in connection with a prison or jail, having an office or guard room 10, in one corner of which a compressed air tank 11 is installed and enclosed by a cage or grating composed of vertical pipes 12 connected by smaller horizontal pipe sections 13. The walls and partitions of the prison will be solidly built of concrete or the like, and the ends of the pipes 12 and 13 embedded therein. The pipes 12 and 13, forming the protective cage or grating, are securely joined together, preferably by welding, so that they form a continuous pneumatic system. The window guards for the several rooms in the prison are similarly constructed with pipes $12^a$ and $13^a$ arranged in the same manner as the pipes 12 and 13, and if cells are used they are constructed in a similar manner.

The tank 11 is adapted to be filled with compressed air through a pipe 14, which is connected with a suitable air compressor. An outlet pipe 15 leads from the tank 11 to a manifold 16 located in front of the same, and connected with a series of pipes 17, 18 and 19. One of these pipes, as 17, is connected by a branch 20 to one of the pipes 12, constituting a part of the cage which protects the storage tank 11 and the parts associated therewith. The pipes 18 and 19 have branches 21 and 22 respectively, which form the main connecting pipes leading to the several window guards or cells in the different rooms. If the invention is installed in a building while the latter is in the process of construction, the main connecting pipes 21, 22 and the like may be embedded in the concrete walls or partitions. If the device is installed in an old building, these pipes may be conveniently located adjacent the walls or ceilings.

The pipes 17, 18 and 19 are connected individually to different sections of the system, and each leads individually to a cylinder 23. The outlet pipe 15 from the tank has a branch 24 forming a by-pass leading to a cylinder manifold 25, which is connected to each of the cylinders 23 by two branches 26 which lead to the diametrically opposite ports in the cylinder near the top thereof. The upper end of each cylinder 23 has a pipe 27 leading therefrom to a manifold 28, which is connected to a whistle or other alarm 29, and adapted to sound the same whenever compressed air enters the manifold 28.

Each of the cylinders 23 contains a piston 30, having a conical upper end 31, which, when the system is filled with compressed air, is adapted to seat against the lower end of the pipe 27, as indicated in dotted lines in Figure 4. If, for any reason, however, the compressed air in any one of the pipes 17, 18 or 19 should be allowed to escape, the piston 30 will drop by gravity to the position shown in full lines in Figure 4, and the compressed air from the tank 11 will enter through the pipe 24, manifold 25 and branches 26 into the corresponding cylinder 23, and will pass thence upwardly through the pipe 27 and manifold 28 and sound the whistle or other alarm. Since the two branches 26, leading to each of the cylinders 23, are connected with the same source of air pressure and lead to diametrically opposite ports on the piston 30, the pressure upon the sides of the piston will be balanced, so that there will be no tendency for the piston to bind against the sides of the cylinder, and it will be free to act under the influence of gravity, or under influence of air pressure introduced into the lower end of the cylinder.

A pressure indicator 32 is connected with the tank 11, and each of the pipes 17, 18 and 19 is provided with a similar pressure indicator 33. A valve 34 is provided between each pressure indicator 33, and the corresponding cylinder 23, and a valve 35 is also provided in each of the pipes 17, 18 and 19 below the respective indicators 33 and the respective branches 20, 21 and 22. A valve 36 is also provided in the branch pipe 24 between the main outlet 15 and the cylinder manifold 25.

Each of the main connecting pipes 21 and 22 contains a bar 37, as indicated in Figure 6, which extends substantially throughout its length, and is formed with ribs or flanges 38, so that it will be impossible to collapse the pipe by pinching, so as to cut off the air connection leading to that part of the system where a break is contemplated.

When the system is in operation, the storage tank 11 is automatically maintained at a predetermined pressure, which may be read on the indicator 32. The entire system is also maintained normally at substantially equal pressure, and the pressure in any individual portion of the system may be read on the corresponding indicator 33. In filling the system with compressed air, the valves 35 are opened until the desired pressure is obtained, and are then closed. Whenever any of the indicators shows a decrease in pressure due to slow leakage, the corresponding valve 35 may be opened until the proper pressure is restored. The valve 36 remains open at all times, except that it may be temporarily closed during the initial filling of the system until the pistons 30 are raised above the outlets of the pipes 26.

Whenever a break occurs in any part of the system, or whenever the pressure escapes by reason of a leak or other cause, the piston 30, in the cylinder which is connected to that part of the system will immediately drop and uncover the outlets of the pipes 26. The air from the tank 11, which is always maintained at a predetermined pressure will then reach the whistle through the open valve 36, and the corresponding cylinder, pipe 27, and manifold 28 and sound the alarm. The indicator 33, which is connected to the part of the system which is broken, may be immediately noted by the guard, and he will know in what locality the break has occurred. The storage tank 11, the whistle 29 and all of the valves and indicators are located within the cage in one corner of the guard room or office where they are protected at all times against tampering, not only by the presence of the guard, but by the grating formed by the pipes 12 and 13, which are a part of the system.

All of the connecting pipes, particularly where they are exposed, are protected by the bars 37, so that it is impossible to shut off any part of the system to render it inoperative. The system, therefore, affords a means of positively detecting any attempted break, since it is impossible for a cut to be made without immediately sounding the alarm, which will continue to sound until the cut is repaired, or the valve 36 shut off. It is an effective means for discouraging attempted breaks, because of the knowledge that it is impossible to make an attack without instantly sounding the alarm.

While I have shown the invention as applied to a prison, it is obvious that a system arranged in a similar manner may be used in a vault for preventing burglary. It is also apparent that various modifications may be made in the construction and relative arrangement of the various elements of the system without departing from the salient features of the invention as expressed in the appended claims.

What is claimed is:

1. In a structure of the character described, a plurality of pipes connected together to form series of gratings, a source of compressed air having an outlet with branches connected to the respective series of gratings, valves in said branches adapted to be closed when the desired pressure has been obtained in the system, a cylinder and a pressure indicator connected to each of said branches, each cylinder having a lateral port, a piston normally acting under the influence of air pressure in the respective branch pipes to close said port but adapted to drop by gravity to uncover said port when the air pressure is removed, a pressure operated alarm having a connection to the upper ends of the several cylinders, a by-pass and manifold connecting the source of compressed air directly to the several ports so as to sound the alarm whenever the port in any cylinder is uncovered, and a manually operable valve in said by-pass.

2. In a structure of the character described, the combination of a system of connected pipes, a source of compressed air having an outlet, with a connecting pipe leading therefrom to said system, a valve between the system of pipes and said outlet and adapted to be closed when the desired pressure has been obtained in the system, a cylinder connected with the system and having diametrically opposed ports, a piston normally acting under the influence of air pressure in the system to close said ports but adapted to drop by gravity and uncover said ports when the air pressure is released by a break in the system, a pressure operated alarm having a connection to the upper end of the cylinder, and a by-pass connecting the source of compressed air with said ports independently of said valve, so as sound the alarm whenever the ports are uncovered by the piston.

3. In a structure of the character described, a pneumatic system comprising a tank normally filled with compressed air, a series of pipes connected to said tank, a valve controlling communication between the series of pipes and the tank, an upright cylinder having its lower end connected with the series of pipes and having a lateral port connected with the tank independently of said valve, a piston in said cylinder and normally acting under the influence of air pressure in the series of pipes to close the port in the cylinder but adapted to drop by gravity and uncover said port when the pressure in the pipes is released by a break therein, and a signal connected to the cylinder and operable whenever said port is uncovered.

4. In a structure of the character described, a pneumatic system comprising a tank normally filled with compressed air, several series of pipes connected to said tank, an individual valve for each series of pipes controlling communication between the same and the tank, an upright cylinder for each series of pipes with its lower end connected thereto, each cylinder having a port, a by-pass and manifold connecting the tank directly to the several ports, a manually operable valve in said by-pass, a piston in each cylinder normally acting under the influence of air pressure in the respective series of pipes to close the port in the cylinder but adapted to drop by gravity and uncover said port when the pressure beneath the piston is released by a break in the series of pipes connected therewith, and a signal connected to the upper ends of the several cylinders and operable by air pressure when anyone of said ports is uncovered.

5. In a structure of the character described, an alarm operable by pneumatic pressure, an upright cylinder with its upper end connected with said alarm, the upper part of said cylinder having diametrically opposite ports, a source of compressed air connected with said ports, and a piston normally supported by pneumatic pressure beneath the same in a position to cover said ports but adapted to drop by gravity when said pneumatic pressure is released, thereby uncovering said ports so that the compressed air from said source may reach the alarm and sound the same.

In testimony that I claim the foregoing as my own, I have hereto affixed my signature.

DAVID FRANKLIN YOUNGBLOOD.